PROCESS FOR PREPARING NON-SOLVATED ALUMINUM HYDRIDE

Theodore C. Kraus, Cheshire, James A. Scruggs, West Haven, and Samuel I. Trotz, Mount Carmel, Conn., assignors to Olin Mathieson Chemical Corporation
No Drawing. Filed Mar. 2, 1962, Ser. No. 177,703
Int. Cl. C01b 6/00
U.S. Cl. 423—645    6 Claims This invention relates to the preparation of non-solvated aluminum hydride. More particularly, this invention relates to a process in which hydrogen chloride is reacted with an excess of an alkali metal aluminum hydride in the presence of a lower dialkyl ether to yield non-solvated aluminum hydride.

Aluminum hydride is useful as a reducing agent, as a fuel in solid propellants, and as an intermediate. The non-solvated aluminum hydride of this invention when incorporated with oxidizers is capable of being formed into a wide variety of grains, tablets, and shapes, all with desirable mechanical and chemical properties. Propellants produced by methods described in this application burn uniformly without disintegration when ignited by conventional means, such as a pyrotechnic type igniter, and are mechanically strong enough to withstand ordinary handling.

Although a great number of attempts have been made to prepare non-solvated aluminum hydride, the end result has been the formation of either an impure polymeric product or a solid solvated polymer from which the removal of all of the solvent without decomposition could not be achieved. Finholt et al. (JACS, 69, 1199–1203 (1947)) reacted lithium aluminum hydride with aluminum chloride in the presence of diethyl ether and obtained a solid with a variable composition. Although the ratio of hydrogen to aluminum in the solid was 3:1 within experimental error, the total weight of the aluminum and the hydrogen in the solid product was always less than the total weight of the sample, the difference being the weight of the diethyl ether in the solvated compound. It was concluded by Finholt et al., after repeated efforts to remove the ether from the solid product by drying under vacuum at temperatures of up to about 80° C. that the complete removal of the solvent from the aluminum hydride formed by the reaction of lithium aluminum hydride and aluminum chloride in diethyl ether could not be accomplished without loss of hydrogen. Hurd (Chemistry of the Hydrides, 1952, John Wiley and Sons, Inc., pages 95–98) presents a thorough review of laboratory methods for the preparation of solvated-aluminum hydride. Hurd states that aluminum hydride never has been isolated except in the form of a highly polymerized compound having the general formula $(AlH_3)_x$. Further, Hurd states that lithium aluminum hydride can be reacted with aluminum chloride in ether solution to form lithium chloride and a solution of aluminum hydride and ether and that this solution of aluminum hydride cannot be evaporated to obtain a volatile aluminum hydride. Chizinsky et al. (JACS 77, 3164–5, (1955)) have described a method for the preparation of non-solvated aluminum hydride. First, they prepared a solution of aluminum hydride in diethyl ether by reaction of lithium aluminum hydride and aluminum chloride. The solution of aluminum hydride was filtered promptly (before polymerization could occur) through sintered glass under nitrogen into an inert liquid (pentane or ligroin were found to be suitable). They state it is essential that the hydride solution be rapidly mixed with a relatively large volume of the inert liquid and that a satisfactory method is to run the solution in a thin film down a wire while the precipitant is vigorously stirred by a magnetic stirrer. On drying the resulting fluffy precipitate under vacuum at room temperature for at least twelve hours a product was obtained which on analysis was shown to correspond to aluminum hydride.

Previous to the applicants' discovery no commercially feasible process for the preparation of non-solvated aluminum hydride existed. In the process of this invention, hydrogen chloride is reacted with an excess of an alkali metal aluminum hydride dissolved in a lower dialkyl ether to yield aluminum hydride, the alkali metal chloride and hydrogen. The reaction takes place according to the following equation:

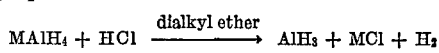

$$MAlH_4 + HCl \xrightarrow{\text{dialkyl ether}} AlH_3 + MCl + H_2$$

wherein M is an alkali metal selected from the group consisting of lithium, sodium and potassium. The alkali metal chloride, being insoluble in the lower dialkyl ether, precipitates during the reaction and is removed by a convenient method, such as, by filtration. Hydrogen generated during the reaction is allowed to escape from the reactor and is measured to determine the extent of the reaction. After removal of the insoluble alkali metal chloride, the filtrate is evaporated to dryness under vacuum at room temperature. The dry solid which results contains the etherated or solvated aluminum hdyride product plus the unconverted alkali metal aluminum hydride. Before proceeding with the desolvation step it is preferred to grind the dry solid to a fine powder. The complete removal of ether from the solvated product is accomplished by heating at a temperature ranging from ambient temperature to an elevated temperature of from about 60° to about 150° C. Preferably during this heating step a vacuum or a nitrogen-sweep is employed to facilitate removal of the ether. During the desolvation step the intermediate product is maintained at the elevated temperature for a sufficiently long period of time to insure quantitative elimination of the ether. Depending upon the technique employed, this time will range from about 0.5 to about 20 hours or more. The product remaining after the heat treatment phase contains the aluminum hydride product in non-solvated form together with the unreacted alkali metal aluminum hydride which can then be extracted from the non-solvated product with a lower dialkyl ether. Following the ether wash, the product is dried again, preferably either under vacuum or with the aid of a nitrogen sweep, at room temperature or at slightly higher temperatures. The reaction is essentially quantitative and although some of the non-solvated product is removed in the ether in the final ether wash, this lost product can be recovered by recycling. The in hand yield varies from about 60 to about 85 percent of the theoretical based on the weight of the hydrogen chloride charged to the reactor.

The temperature of the reaction will generally be from about −25° C. to about +50° C. with the preferred temperature being from about −10° C. to about +32° C.

In carrying out the reaction any of the lower dialkyl ethers can be employed. Suitable lower dialkyl ethers include methyl ether, ethyl ether, n-propyl ether, n-butyl ether, n-amyl ether, methyl ethyl ether, methyl propyl ether, methyl butyl ether, ethyl propyl ether, ethyl butyl ether, propyl butyl ether, isopropyl ether, isobutyl ether, isoamyl ether, methyl isopropyl ether, methyl isobutyl ether, ethyl isobutyl ether, ethyl isopropyl ether, ethyl isobutyl ether, ethyl isoamyl ether, etc. In a like manner any of the lower dialkyl ethers mentioned above are suitable for extraction of the unreacted alkali metal aluminum hydride from the crude product consisting of the alkali metal aluminum hydride and the nonsolvated aluminum hydride although those ethers boiling at less than 100° C. are preferred.

In carrying out the reaction it is advantageous to maintain the initial concentration of the alkali metal aluminum hydride at about 1 to about 10.0 percent by weight based on the weight of the lower dialkyl ether employed. The proportion of ether to the reactants not only affects the solubility of the reactants but also the extent of solution of the final product in the reaction mixture and control of the reaction temperature. In the applicants' novel process it has been found that an excess of the alkali metal aluminum hydride must be employed. Although the role of the excess lithium aluminum hydride is not fully understood, it is known that the excess of the alkali metal aluminum hydride participates in the solubilization of the aluminum hydride formed in the reaction and, in addition, it appears to play a significant role in the desolvation step of the applicants' process in that it makes possible the complete removal of the lower dialkyl ether during the desolvation step. It has been found that if the unreacted alkali metal aluminum hydride is removed from the intermediate product containing the etherated or solvated aluminum hydride before the desolvation step it is impossible to remove the ether from the solvated aluminum hydride. The molar ratio of the hydrogen chloride to the alkali metal aluminum chloride employed can be varied widely from about 0.95 to about 0.33, with the preferred molar ratio being from about 0.95 to about 0.74. Desolvation of the etherated aluminum hydride can be effected over a wide range of conditions with respect to the time and temperature employed. In the initial stages it is sufficient to maintain the intermediate product being desolvated under conditions of ambient temperature while preferably subjecting the material to an inert gas sweep or to a vacuum, however, the latter part of the desolvation step, in which the final quantity of ether is removed from the solvated product, requires temperatures of from about 60° C. to about 150° C. The rate of removal of the ether from the solvated product is dependent on the particle size, exposure of the surface and efficiency of removal of the liberated ether.

The non-solvated aluminum hydride produced by practicing the method of this invention can be employed as an ingredient of solid propellant compositions in accordance with general procedures which are well understood in the art, inasmuch as the non-solvated aluminum hydride produced by practicing the present process is readily oxidized using conventional solid oxidizers, such as ammonium perchlorate, potassium perchlorate, sodium perchlorate, ammonium nitrate and the like. In formulating a solid propellant composition employing non-solvated aluminum hydride produced in accordance with the present invention, generally from 10 to 35 parts by weight of non-solvated aluminum hydride and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided non-solvated aluminum hydride can be admixed with a high solids content solution of a partially condensed urea-formaldehyde or phenol-formaldehyde resin, the proportions being such that the amount of the resin is about 5 to 10 percent by weight, based upon the weight of the oxidizer and the non-solvated aluminum hydride. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al. and U.S. Pat. No. 2,646,596 to Thomas et al.

The following examples will serve to further illustrate this invention.

EXAMPLE I

The apparatus employed in this experiment consisted of a one liter, three-necked glass reactor equipped with a magnetic stirrer, a gas inlet for nitrogen, and an inlet tube for hydrogen chloride addition. An outlet from the reactor was connected to a Dewar-type condenser which, in turn, was connected in series with a mineral oil-filled bubble-off, a gas washing tower filled with water and finally to a wet-test meter.

750 ml. of diethyl ether, distilled from lithium aluminum hydride, was placed in the reactor while the flask was flushed with dry nitrogen. Ten grams of lithium aluminum hydride (96.4 percent $LiAlH_4$—0.255 mole) was added to the reactor and dissolved in the ether by stirring for one hour. After the lithium aluminum hydride had dissolved in the ether, the reaction mixture was cooled to 5° C. by means of an ice-water bath. In the next step hydrogen chloride was added through the inlet tube, which projected below the surface of lithium aluminum hydride-ether solution, at a rate which permitted control of the temperature between 0° C. and 5° C. The extent of reaction and the rate of addition of hydrogen chloride was determined by measurement of the hydrogen evolution by means of the wet-test meter. After 0.24 mole (S.T.P.) of the hydrogen had been evolved, the hydrogen chloride addition was terminated. The resulting reaction mixture was stirred for 15 minutes and then filtered through a sintered-glass funnel. The ether was distilled from the reaction mixture under vacuum yielding a white crystalline solid which was ground to a fine powder. This solid, after being stirred at room temperature while being maintained under high vacuum for 64 hours, contained 17.63 percent carbon and 10.4 percent hydrogen by analysis. The solid was then desolvated by heating under high vacuum (maximum vacuum employed was about $10^{-2}$ mm. Hg) at a temperature of from room temperature to 75° C. over a period of 2.2 hours and then at 75° C. for 3 hours. The desolvated material was then washed by stirring with diethyl ether in the amount of 10 ml. of ether per gram of the crude product for 0.5 hour, the resulting slurry was filtered and the filter cake washed with two portions of ether totaling 5 ml. per gram of crude product. In the final step the desolvated aluminum hydride product was dried at room temperature under high vacuum (maximum vacuum was about $10^{-2}$ mm. Hg) for 19 hours. The weight of non-solvated aluminum hydride recovered was 4.35 grams which corresponds to a yield of 60.6 percent of the theoretical quantity.

The non-solvated aluminum hydride product was analyzed for aluminum, hydrogen, carbon, chlorine, and lithium. The following results were obtained:

Calc'd for $AlH_3$ (percent): Al, 89.92; H, 10.08 C, —; Cl, —; Li, —. Found (percent): Al, 87.5; H, 10.3; C, 0.5; Cl, 0.63; Li, 0.5.

EXAMPLE II

In this experiment the reactor employed was a five-liter three-necked flask equipped with a mechanical stirrer, an inlet tube for nitrogen addition, and a second inlet tube for hydrogen chloride addition. An outlet from the reactor was connected to a Dewar-type condenser which, in turn, was connected in series to a Nujol-filled bubble-off, a water-filled washing tower, and a wet-test meter.

Four liters of diethyl ether, distilled from lithium aluminum hydride, was placed in the reactor while the reactor was flushed with dry nitrogen. 86 grams of lithium aluminum hydride (96.4 percent $LiAlH_4$—2.14 moles) was dissolved in the diethyl ether by stirring for one half hour and the solution was then cooled to 5° C. by means of an ice-water bath. Hydrogen chloride was added through the hydrogen chloride inlet tube, which projected below the surface of the lithium aluminum hydride-ether solution, at a rate which permitted control of the temperature between 0° C. and 5° C. The extent of the reaction and the rate of addition of hydrogen chloride was determined by the measurement of the hydrogen evolution by means of the wet-test meter. After 2.0 moles (S.T.P.) of hydrogen had been evolved in 3.5 hours, hydrogen chloride addition was terminated. The reaction mixture was stirred for 35 minutes, allowed to stand for 15 minutes and then filtered through a sintered-glass funnel.

In the next step the ether was distilled under vacuum from the reaction liquor leaving a white crystalline solid which was ground to a fine powder. This solid, containing the aluminum hydride product in solvated form together with the unreacted lithium aluminum hydride, after being dried at room temperature under high vacuum for 1 hour was desolvated by heating under high vacuum from room temperature to 75° C. over a period of three hours and then at 75° C. for four hours. The maximum vacuum employed was about $10^{-2}$ mm. Hg. At this stage, the solid product contained, by analysis, a carbon content of 0.97 percent and the weight was 57.3 grams. The resulting material was washed with stirring with 580 ml. of ether for 30 minutes. The slurry was filtered and the filter cake washed with two portions of ether totaling 5 ml. per gram of the product. The non-solvated aluminum hydride product was then dried in a one-liter flask at room temperature under high vacuum (maximum about $10^{-2}$ mm. Hg) for 88 hours. The recovered amount of dry, final product was 44.5 grams (82.4 percent of the theoretical quantity).

The non-solvated aluminum hydride product was analyzed for aluminum, hydrogen, carbon, chlorine, and lithium. The following results were obtained:

Calc'd for $AlH_3$ (percent): Al, 89.92; H, 10.08; C, —; Cl, —; Li, —. Found (percent): Al, 85.8, 86.3; H, 10.48; C, 0.5; Cl, 1.0; Li, 1.2.

EXAMPLES III–X

A number of additional experiments (Examples III–X) were performed in the same manner as described in Example I. Pertinent data with respect to these examples are set out in Table 1 which follows.

What is claimed is:

1. A process for the preparation of non-solvated aluminum hydride which comprises (A) reacting hydrogen chloride with an excess of an alkali metal aluminum hydride of the formula:

$$MAlH_4$$

wherein M is an alkali metal selected from the group consisting of lithium, sodium and potassium and in the presence of a lower dialkyl ether of the formula:

$$R_1OR_2$$

wherein $R_1$ and $R_2$ are alkyl radicals having from 1 to 5 carbon atoms, the molar ratio of the said hydrogen chloride reacted with the said alkali metal aluminum hydride being within the range of from about 0.95 to about 0.33, (B) separating liquid and solid phases of the resulting reaction mixture, (C) recovering from the liquid phase a solvated aluminum hydride product containing the unreacted alkali metal aluminum hydride (D) heating the said solvated aluminum hydride product at a temperature of from about 20° C. to about 150° C. and for a period of time sufficient to remove the lower dialkyl ether associated with the aluminum hydride whereby a non-solvated aluminum hydride product containing the unreacted alkali metal aluminum hydride is obtained and (E) recovering the non-solvated aluminum hydride.

2. The process of claim 1 wherein the reaction is carried out at a temperature within the range of from about −25° C. to about +50° C.

3. The process of claim 1 wherein the said alkali metal aluminum hydride is lithium aluminum hydride.

4. The process of claim 1 wherein the said lower dialkyl ether is diethyl ether.

5. The process of claim 1 wherein the concentration of the said alkali metal aluminum hydride initially present in the reaction mixture is from about 0.5 to about 10 percent by weight based on the weight of the lower dialkyl ether employed.

6. The process for the preparation of non-solvated aluminum hydride which comprises (A) reacting hydrogen chloride with an excess of lithium aluminum hydride at a temperature of from about −25° to about +50° C. and in the presence of diethyl ether, the molar ratio of the said hydrogen chloride reacted with the said lithium aluminum hydride being from about 0.95 to about 0.33, the concentration of the lithium aluminum hydride initially present in the reaction mixture being from about 0.5 to about 10 weight percent based on the weight of the diethyl ether employed, (B) separating liquid and solid phases of the resulting reaction mixture, (C) recovering

TABLE 1.—EXAMPLES III–X

| Example | Reaction conditions | | | | |
|---|---|---|---|---|---|
| | $(C_2H_5)_2O$ (ml.) | $LiAlH_4$ (moles) | HCl (moles) | Excess $LiAlH_4$ (percent) | Max. temperature of reaction (° C.) |
| III | 700 | 0.254 | 0.238 | 6.7 | 5 |
| IV | 4,000 | 2.19 | 1.75 | 25 | 5 |
| V | 4,000 | 2.23 | 1.94 | 15 | 5 |
| VI | 4,000 | 2.19 | 1.75 | 25 | 5 |
| VII | 700 | 0.255 | 0.128 | 100 | 5 |
| VIII | 700 | 0.407 | 0.323 | 26 | 31 |
| IX | 750 | 0.254 | 0.237 | 7 | 5 |
| X | 1,500 | 0.515 | 0.448 | 15 | 5 |

| Example | Desolvation | | | | Product | | | | | |
|---|---|---|---|---|---|---|---|---|---|---|
| | Total time (hours) | Time at maximum temperature (hours) | Maximum temperature (° C.) | Ether removal method | Yield (percent) | Analysis | | | | |
| | | | | | | Al | C | H | Li | Cl |
| III | 4 | 2 | 75 | Vacuum | 60.5 | 87.0 | 1.6 | 10.6 | 0.8 | 0.6 |
| IV | 6 | 4 | 70 | do | 70 | 86.8 | 0.5 | 10.3 | 0.8 | 0.9 |
| V | 11 | 7.5 | 75 | do | 78 | 87.3 | 0.5 | 10.4 | 0.9 | 1.2 |
| VI | 7 | 4 | 75 | do | 82.4 | 86.1 | 0.5 | 10.5 | 1.2 | (1) |
| VII | 5 | 3 | 75 | do | 72.0 | (1) | (1) | (1) | 0.8 | (1) |
| VIII | 3.5 | 1.5 | 75 | Nitrogen | 60.0 | (1) | 0.9 | (1) | 0.7 | (1) |
| IX | 5 | 3 | 75 | do | 60.6 | (1) | 1.0 | (1) | 2.1 | (1) |
| X | 3 | 1 | 100 | do | 87.2 | | 0.5 | 10.0 | 0.5 | 0.8 |

[1] Not determined.

from the liquid phase a solvated aluminum hydride product containing the unreacted lithium aluminum hydride, (D) heating the said solvated aluminum hydride product at a temperature of from about 20° C. to about 150° C. and for a period of time sufficient to remove the diethyl ether associated with the aluminum hydride whereby a non-solvated aluminum hydride product containing the unreacted lithium aluminum hydride is obtained, and (E) recovering the non-solvated aluminum hydride.

References Cited

Hoffman, LMSD703150, Aluminum Hydride, a literature review, August 1960, 23 pages.

LELAND A. SEBASTIAN, Primary Examiner

U.S. Cl. X.R.

149—19, 46, 60, 76, 77